Patented May 19, 1936

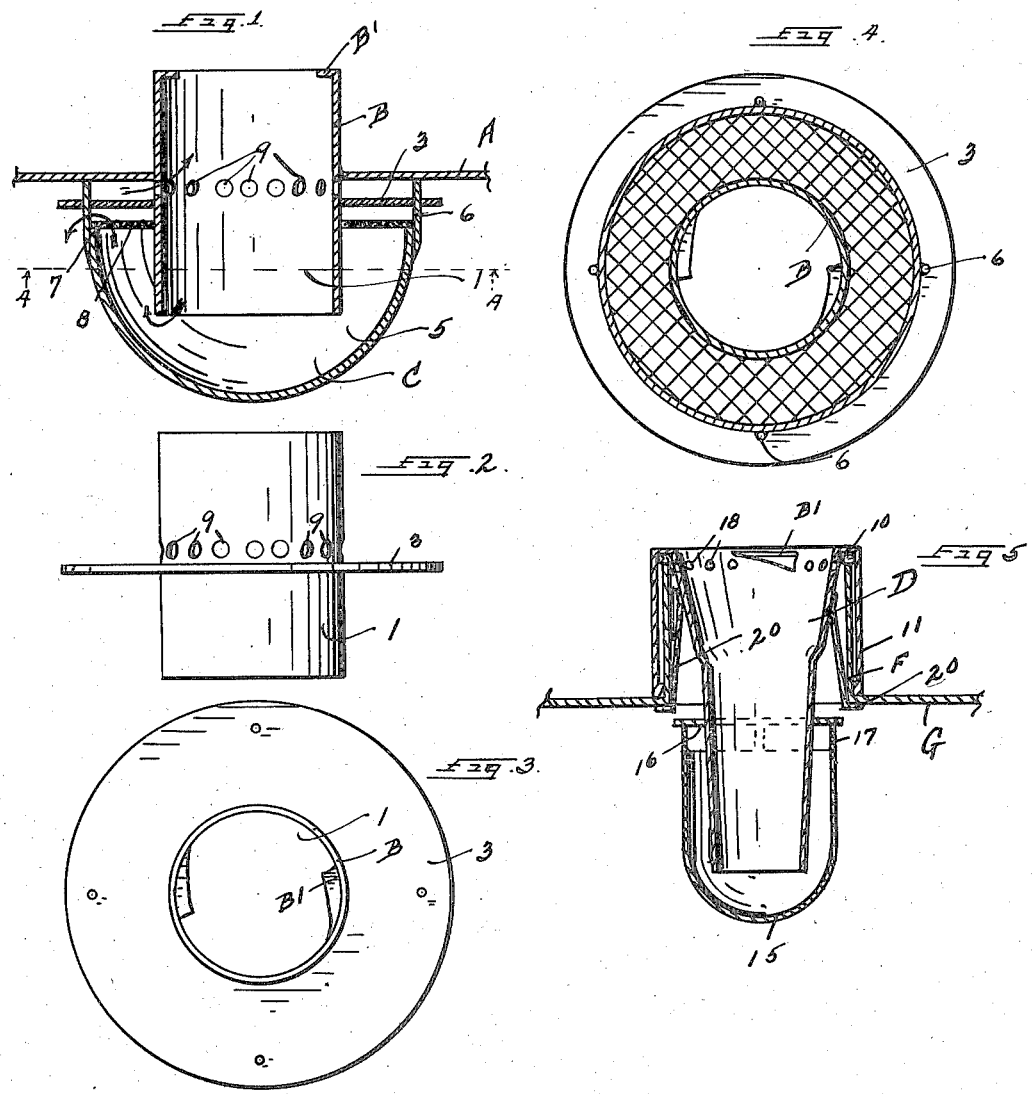

2,041,070

UNITED STATES PATENT OFFICE 2,041,070

THEFTPROOF GAS TANK

Harold D. Jones, Payson, Utah

Application January 28, 1935, Serial No. 3,869

3 Claims. (Cl. 220—86)

My invention relates to a thief proof gas tank and gas tank appliances, and has for its object to provide a new and efficient device for inserting into a gas tank filling tube or for building therein a device which will prevent siphoning the gas from the tank.

A further object is to provide a thief proof gas tank filling tube which will prevent the insertion of a siphon tube therein and which at the same time will allow for filling of the tank at the usual rate of speed now used in the open type of filling tube.

A still further object is to provide a gas tank tube or an appliance to be inserted therein which will prevent foreign material from getting into the fuel through the filling tube.

A still further object is to provide a gas tank filling tube which will prevent loss of fuel through the tube, should the cover therefor become lost. The splash in the fuel will strike the bowl and be deflected and the little that catches in the bowl will strike the walls of the filling tube and will not splash therefrom.

These objects I accomplish with the device illustrated in the accompanying drawing in which similar numerals and letters of reference indicate like parts throughout the several views and as described in the specification forming a part of this application and pointed out in the appended claims.

In the drawing in which I have shown my device:

Figure 1 is a vertical diametrical section of the filling tube for an automobile tank.

Figure 2 is a side view of the filling tube and deflecting plate.

Figure 3 is an inverted plan view of Figure 2.

Figure 4 is a section on line 4—4 of Figure 1.

Figure 5 is a modified form of the device to be used on automobiles already manufactured, to be placed on the regular filling tube.

In the drawing the tank is partially shown as A, and the tube through which the fuel is introduced into the tank as B. The tube B is formed through an opening in the top of the tank and has the lower end 1 extended into the fuel tank as shown in the drawing, Figure 1. Onto the outside surface of the tube B, I then secure a splash plate or deflecting plate 3, formed of an annular ring with the opening to fit the tube B and then welded or secured rigidly thereto. I then provide a bowl C, semi-spherical in form, and of smaller diameter than the plate 3, encircling the lower end of the tube B and the sides of the bowl encircling the tube B, closing off the end with the exception of a space 5 through which the fuel may pass. The edges of the bowl are provided with spaced apart support bars 6 which pass up through holes in the plate 3 and are secured to the top of the tank A by any suitable means. The top 7 of the bowl C may be closed off by a screen 8 if desired, to screen the fuel as it enters the tank and in some cases this must be used to prevent material from entering the tank. The top 7 of the bowl is spaced below the bottom side of the plate 3 sufficient distance for passage of fuel therethrough.

Air holes 9 are provided through the tube B above the level of the deflecting plate 3 to allow air to escape from the tank while it is being filled, but these holes will be too small to insert a rubber tube therein.

Locking lugs B1 are provided on the inner periphery of the top end of the tube B by which the closure cap (not shown) may be secured thereto.

The filling nozzle of the pump is inserted into the tube B and the flow of fuel turned on. The fuel will strike the bowl C and filling the bowl will overflow the sides into the tank and at the same time the air from the tank will pass out through the holes 9 around the filling nozzle. The plate 3 being of larger diameter than the bowl C, the air will pass out through the holes 9 without encountering the flow of fuel through the bowl C or tube B.

The screen 8 is not absolutely necessary, as the deflecting plate will prevent a tube from being inserted around the bottom of the tube B and over the top of the bowl C into the fuel.

In the type of device shown in Figure 5 of the drawing, the top 10 of the filling tube D is made with an annular depending flange 11 theresurrounding and this flange fits down around the filling tube F of the tank G. The tube D is within the tube F and carries the bowl 15 and deflecting plate 16 integral therewith.

The bottom of the tube is shown as tapered and the bowl 15 surrounds the bottom end thereof and extends up the sides to the deflecting flange 16 with spacer bars and support bars 17 spacing and surrounding the bowl from the tube D. The flange 16 is secured rigidly to the tube D. Air escapement holes 18 are provided through the tube D near the top end thereof to allow for passage of air from the tank while it is being filled. Locking spring members 20 are provided to engage the inner end of the filler tube F of the tank and hold the device in place at all times. These members are springs so that the device may be inserted into the filling tube F and the springs will expand when they are therebelow and will engage the inner end to lock the device in place. A screen may or may not be used as desired on the bowl 15.

Having thus described my invention I desire to secure by Letters Patent and claim:

1. In a device of the class described, the combination of a filling tube for gas tanks having the inner end extended into the tank and carrying a horizontal deflecting plate therearound; a series of openings in the tube above the level of the deflecting plate, but within the interior of the tank; and a bowl carried on the end of said tube, spaced therefrom, but entirely surrounding the lower portion thereof, with a space between the top of the bowl and the deflecting plate.

2. In a device for gasoline tanks, the combination of a filling tube; a horizontal deflecting plate secured therearound and extending outwardly therefrom; a bowl carried on the lower end of the tube supported by the plate and means to allow air to escape through the filling tube when gasoline is entering the tank through the filler tube and bowl.

3. In a thief proof gas tank filling tube, the combination of a filling tube extending into the tank; a deflecting plate secured concentric with said tube at right angles thereto; a semi-spherical bowl to encircle the end of the filling tube suspended from said deflecting plate and spaced therefrom; brackets to suspend the bowl from the plate; openings through the side wall of the filling tube above the level of the plate; and a screen secured on the top of said bowl around said filling tube to screen all gasoline passing from said bowl.

HAROLD D. JONES.